H. WELLINGTON.
STREET-LAMP.
No. 6,789.
Reissued Dec. 7, 1875.
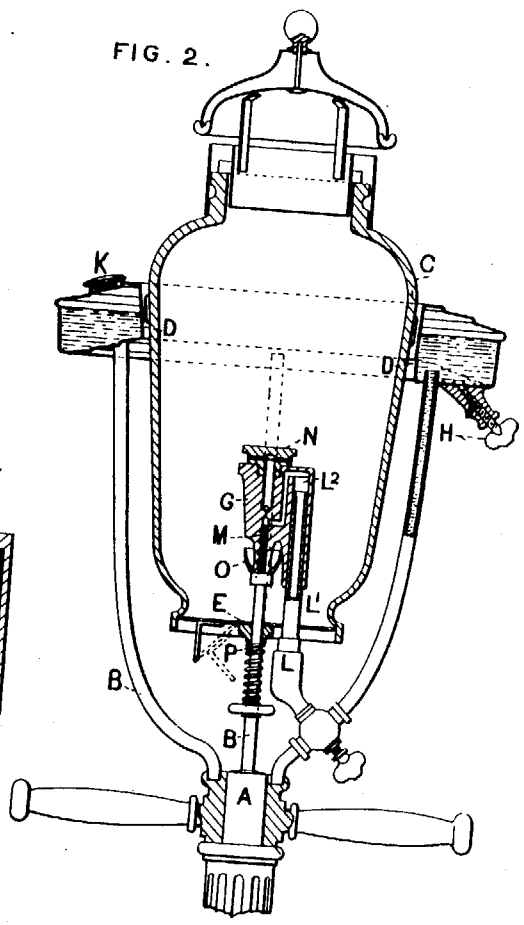
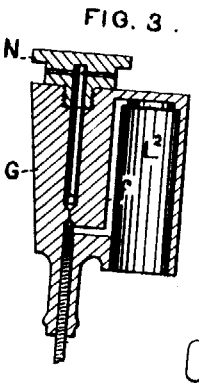
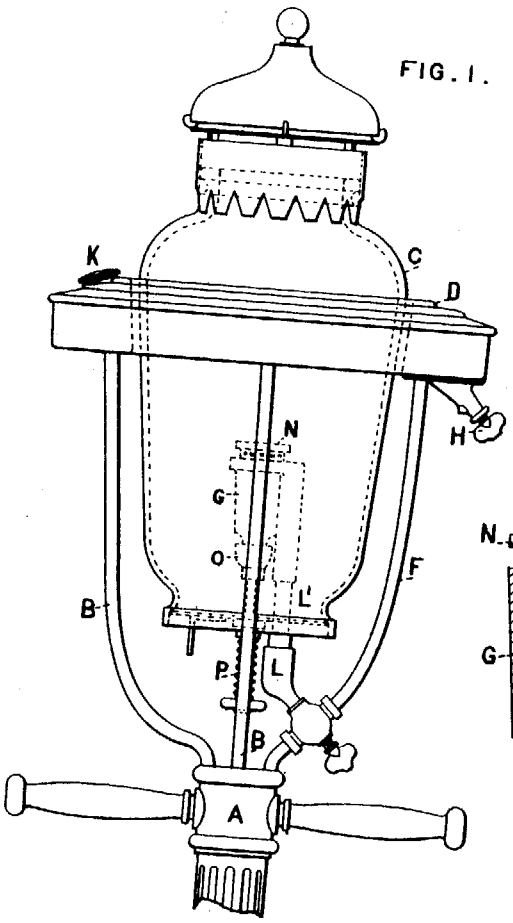
WITNESSES.
John M. Rapley
W. Elliot
Henry Wellington
INVENTOR.
N. PETERS, PHOTO-LITHOGRAPHER, WASHINGTON, D. C.

UNITED STATES PATENT OFFICE.

HENRY WELLINGTON, OF NEW YORK, N. Y.

IMPROVEMENT IN STREET-LAMPS.

Specification forming part of Letters Patent No. 162,728, dated April 27, 1875; reissue No. 6,789, dated December 7, 1875; application filed October 20, 1875.

*To all whom it may concern:*

Be it known that I, HENRY WELLINGTON, of the city, county, and State of New York, have invented certain Improvements in Street-Lamps, of which the following is a specification:

First, my invention consists in the combination, in a street-lamp, of a reservoir for holding the burning fluid, a glass globe resting against the reservoir, a support, against which the base of the globe rests, and a hollow supply-tube leading downwardly from the reservoir, and communicating with the burner from beneath the globe, the whole being constructed substantially as hereinafter set forth, whereby the glass globe can be readily removed for the purpose of cleaning without disturbing any part of the burner or fluid-supply tube; second, in certain improvements in connecting the burner with said reservoir and its vaporizing-chamber; and, third, in providing a hinged screen for the base of the globe, so that it may be readily opened in the operation of lighting the lamp, as will hereinafter appear.

Figure 1 is an elevation of the lamp with all its attachments in proper position. Fig. 2 is a sectional view of the same; and Fig. 3 is a section of the burner as used in said lamp.

At A is shown the top of the lamp-post, to which are attached rods B for supporting the reservoir, the inner face of which serves as a support for the globe, as represented in the drawings, and upon the said inner face of said reservoir are placed suitable metal pieces to hold the globe in a vertical position, and to leave room for the upward passage of air between the globe and reservoir, while its lower end rests upon a slightly-yielding base, as at E.

In the plans here shown the reservoir is directly attached upon the rods B, and one of said rods is hollow, as seen at F, to convey the fluid to the burner. K is an opening, through which to fill the reservoir, having a suitable plug or stopper to close the same. The tube F is provided with a cock, L, for shutting off the fluid from the burner, for repairs or other purposes. The lower end of the wick-tube $L^1$ is secured to the cock L, as shown, and the upper end is secured by a closely-fitting ground joint within the socket $L^2$, in Fig. 3, without the supporting wick-tube inserted therein, and a chamber is also there shown at *f*, which extends down from the top of said socket, and which would be along the side of the wick-tube $L^1$ when it is inserted therein, and said channel serves as the vaporizing-channel or gas-generator, and leads directly to the valve at M, which controls its outlet to the burner at N.

This means of connecting the burner with the supply-tube by a socket and ground joint without a screw or packing is very essential, and in practice is found to entirely prevent leakage, and convenient to take apart for cleaning and rewicking.

P is the valve-stem, by which the flow of of the fluid to the burner is governed. Around this stem is arranged a spring, on which rests the perforated disk or base E, said disk forming the lower support for the globe, in such a manner as to slightly yield upon the spring R. This disk is made in two parts, hinged together as shown in Fig. 2, so that one portion may be depressed by the lamp lighter pressing against a pin projecting below, and which may be forced down, as indicated by the dotted lines in Fig. 2, so that a torch may be inserted to the burner.

It will be observed that by the construction of the fluid-reservoir, the manner of supporting the globe, and the tube leading from the reservoir under the globe, that the said globe can be removed from its position for the purpose of cleaning the same without disturbing any part of the lamp, its burner, or feed-supply tube, which cannot be accomplished in any of the street-lamps of this character as heretofore constructed.

I claim—

1. The combination, in a street-lamp, of the reservoir D, for holding the burning fluid, the glass globe C resting against the reservoir, a support, E, against which the base of the globe rests, and a hollow supply-tube leading downwardly from the reservoir, and forming part of the frame, substantially as described.

2. The vaporizing-chamber, consisting of a tube $L^1$, the socket $L^2$, and the channel $f$ communicating with the said socket and the burner, substantially as described.

3. The hinged perforated base, constructed and arranged substantially as and for the purpose specified.

4. The spring R for supporting in a yielding manner the disk E and globe C, as and for the purpose set forth.

HENRY WELLINGTON.

Attest:

TRUMAN P. DOANE,
BOYD ELIOT.